US011425033B2

(12) United States Patent
Kalra et al.

(10) Patent No.: US 11,425,033 B2
(45) Date of Patent: Aug. 23, 2022

(54) SDN FLOW PATH MODIFICATION BASED ON PACKET INSPECTION

(71) Applicant: Schweitzer Engineering Laboratories, Inc., Pullman, WA (US)

(72) Inventors: Amandeep Singh Kalra, Mill Creek, WA (US); David J. Dolezilek, Pullman, WA (US); Robert Meine, Boise, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 120 days.

(21) Appl. No.: 16/829,775

(22) Filed: Mar. 25, 2020

(65) Prior Publication Data

US 2021/0306255 A1 Sep. 30, 2021

(51) Int. Cl.
*H04L 45/28* (2022.01)
*H04L 12/423* (2006.01)
(Continued)

(52) U.S. Cl.
CPC ............ *H04L 45/28* (2013.01); *H04L 12/423* (2013.01); *H04L 43/026* (2013.01);
(Continued)

(58) Field of Classification Search
CPC ..... H04L 45/28; H04L 12/423; H04L 43/026; H04L 43/028; H04L 43/0841;
(Continued)

(56) References Cited

U.S. PATENT DOCUMENTS 7,710,999 B2  5/2010  Bolder
8,824,274 B1  9/2014  Medved
(Continued)

FOREIGN PATENT DOCUMENTS

CN  203376828  1/2014
CN  106301952  1/2017
(Continued)

OTHER PUBLICATIONS

Ferrus, et al., "SDN/NFV-enabled satellite communications networks: Opportunities, scenarios and challenges." In Physical Communication. Mar. 2016 (Mar. 2016).
(Continued)

*Primary Examiner* — Ian N Moore
*Assistant Examiner* — Rushil Parimal Sampat
(74) *Attorney, Agent, or Firm* — Justin K. Flanagan

(57) ABSTRACT

A network communication system may include intelligent electronic devices (IEDs) in a ring communication network. A software-defined networking device may be programmed by a removable or disconnectable software-defined network (SDN) controller to control the flow path of data packets to the IEDs in the ring network. The software-defined networking device may inspect a data packet intended for a first IED to determine that the inspected data packet requests a responsive data packet from the first IED. A flow path failure may be identified based on a failure to detect a responsive data packet from the first IED within an expected response time.

16 Claims, 4 Drawing Sheets

(51) Int. Cl.
*H04L 43/026* (2022.01)
*H04L 45/00* (2022.01)
*H04L 43/0829* (2022.01)
*H04L 49/55* (2022.01)
*H04L 43/028* (2022.01)

(52) U.S. Cl.
CPC ........ *H04L 43/028* (2013.01); *H04L 43/0841* (2013.01); *H04L 45/22* (2013.01); *H04L 45/38* (2013.01); *H04L 49/555* (2013.01)

(58) Field of Classification Search
CPC ....... H04L 45/22; H04L 49/555; H04L 45/38; H04L 43/0817; H04L 49/094; H04L 1/188; H04L 45/74; H04L 47/28; H04L 45/64; H04L 49/9005; H04L 49/9052; Y04S 40/00; Y02D 30/00
See application file for complete search history.

(56) References Cited

U.S. PATENT DOCUMENTS

| | | | |
|---|---|---|---|
| 9,047,143 | B2 | 6/2015 | Pruss et al. |
| 9,124,485 | B2 | 9/2015 | Heron et al. |
| 9,137,140 | B2 | 9/2015 | Tao et al. |
| 9,178,807 | B1 | 11/2015 | Chua et al. |
| 9,258,212 | B2 | 2/2016 | Pfeifer et al. |
| 9,258,315 | B2 | 2/2016 | Martin |
| 9,270,754 | B2 | 2/2016 | Iyengar et al. |
| 9,276,827 | B2 | 3/2016 | Voit et al. |
| 9,282,164 | B2 | 3/2016 | Finn et al. |
| 9,330,156 | B2 | 5/2016 | Satapathy |
| 9,356,871 | B2 | 5/2016 | Medved et al. |
| 9,392,050 | B2 | 7/2016 | Voit et al. |
| 9,467,536 | B1 | 10/2016 | Kanekar et al. |
| 9,503,363 | B2 | 11/2016 | Sivabalan et al. |
| 9,596,141 | B2 | 3/2017 | McDowall |
| 10,560,390 | B2 | 2/2020 | Gammel |
| 10,652,084 | B2* | 5/2020 | Witko ................... H04L 67/141 |
| 10,756,956 | B2 | 8/2020 | Gammel |
| 10,812,392 | B2 | 10/2020 | Gammel |
| 2002/0144156 | A1 | 10/2002 | Copeland |
| 2007/0147415 | A1* | 6/2007 | Marusca ............. H04L 43/0817 370/465 |
| 2007/0217343 | A1 | 9/2007 | Znamova |
| 2007/0280239 | A1 | 12/2007 | Lund |
| 2008/0095059 | A1 | 4/2008 | Chu |
| 2010/0097945 | A1 | 4/2010 | Raftelis |
| 2010/0324845 | A1 | 12/2010 | Spanier |
| 2012/0300615 | A1 | 11/2012 | Kempf |
| 2012/0300859 | A1 | 11/2012 | Chapman |
| 2012/0331534 | A1 | 12/2012 | Smith |
| 2013/0121400 | A1 | 5/2013 | Eliezer |
| 2013/0163475 | A1 | 6/2013 | Beliveau |
| 2013/0311675 | A1 | 11/2013 | Brocade |
| 2014/0003422 | A1 | 1/2014 | Mogul |
| 2014/0095685 | A1 | 4/2014 | Cvijetic et al. |
| 2014/0109182 | A1 | 4/2014 | Smith et al. |
| 2014/0280893 | A1 | 9/2014 | Pfeifer et al. |
| 2014/0317248 | A1 | 10/2014 | Holness et al. |
| 2014/0317256 | A1 | 10/2014 | Jiang et al. |
| 2014/0317293 | A1 | 10/2014 | Shatzkamer |
| 2014/0330944 | A1 | 11/2014 | Dabbiere et al. |
| 2014/0365634 | A1 | 12/2014 | Metz et al. |
| 2015/0130935 | A1 | 5/2015 | Siann et al. |
| 2015/0281036 | A1 | 10/2015 | Sun et al. |
| 2016/0014819 | A1 | 1/2016 | Cona |
| 2016/0112269 | A1 | 4/2016 | Singh et al. |
| 2016/0139939 | A1 | 5/2016 | Bosch et al. |
| 2016/0142427 | A1 | 5/2016 | De Los Reyes et al. |
| 2016/0234234 | A1 | 8/2016 | McGrew et al. |
| 2017/0019417 | A1 | 1/2017 | McGrew et al. |
| 2017/0026349 | A1 | 1/2017 | Smith et al. |
| 2017/0054626 | A1 | 2/2017 | Sivabalan et al. |
| 2017/0070416 | A1 | 3/2017 | Narayanan et al. |
| 2017/0142034 | A1* | 5/2017 | K ........................... H04L 1/188 |
| 2017/0288947 | A1* | 10/2017 | Kaniampady Sebastian ............... H04L 41/0654 |
| 2017/0288950 | A1 | 10/2017 | Manson et al. |
| 2018/0176090 | A1 | 6/2018 | Lessmann |
| 2018/0241621 | A1 | 8/2018 | Vaishnavi |
| 2018/0287725 | A1 | 10/2018 | Rabinovich |
| 2018/0287859 | A1 | 10/2018 | Desigowda |
| 2019/0007862 | A1* | 1/2019 | Ha ........................... H04L 47/28 |
| 2019/0273686 | A1 | 9/2019 | Gammel et al. |

FOREIGN PATENT DOCUMENTS

| | | |
|---|---|---|
| EP | 3109128 | 12/2016 |
| WO | 2016206741 | 12/2016 |
| WO | 2017067578 | 4/2017 |

OTHER PUBLICATIONS

Mizrahi et al., Time-based Updates in OpenFlow: A Proposed Extension to the OpenFlow Protocol, Jul. 7, 2013, CCIT Report #835, Jul. 2013, EE Pub No. 1792, Technion, Israel (Year: 2013).

Gember et al., "Toward Software-Defined Middlebox Networking" In: Proceedings of the 11th ACM Workshop on Hot Topics in Networks. Oct. 30, 2012.

Molina et al., "Performance Enhancement of High-Availability Seamless Redundancy (HSR) Networks Using OpenFlow" IEEE, Nov. 30, 2015.

PCT/US2021/021634 Patent Cooperation Treaty, International Search Report and Written Opinion of the International Searching Authority, dated Jun. 11, 2021.

* cited by examiner

SDN FLOW PATH MODIFICATION BASED ON PACKET INSPECTION

TECHNICAL FIELD

This disclosure relates to intelligent electronic devices (IEDs) in a ring network.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

DETAILED DESCRIPTION

Figure 1:
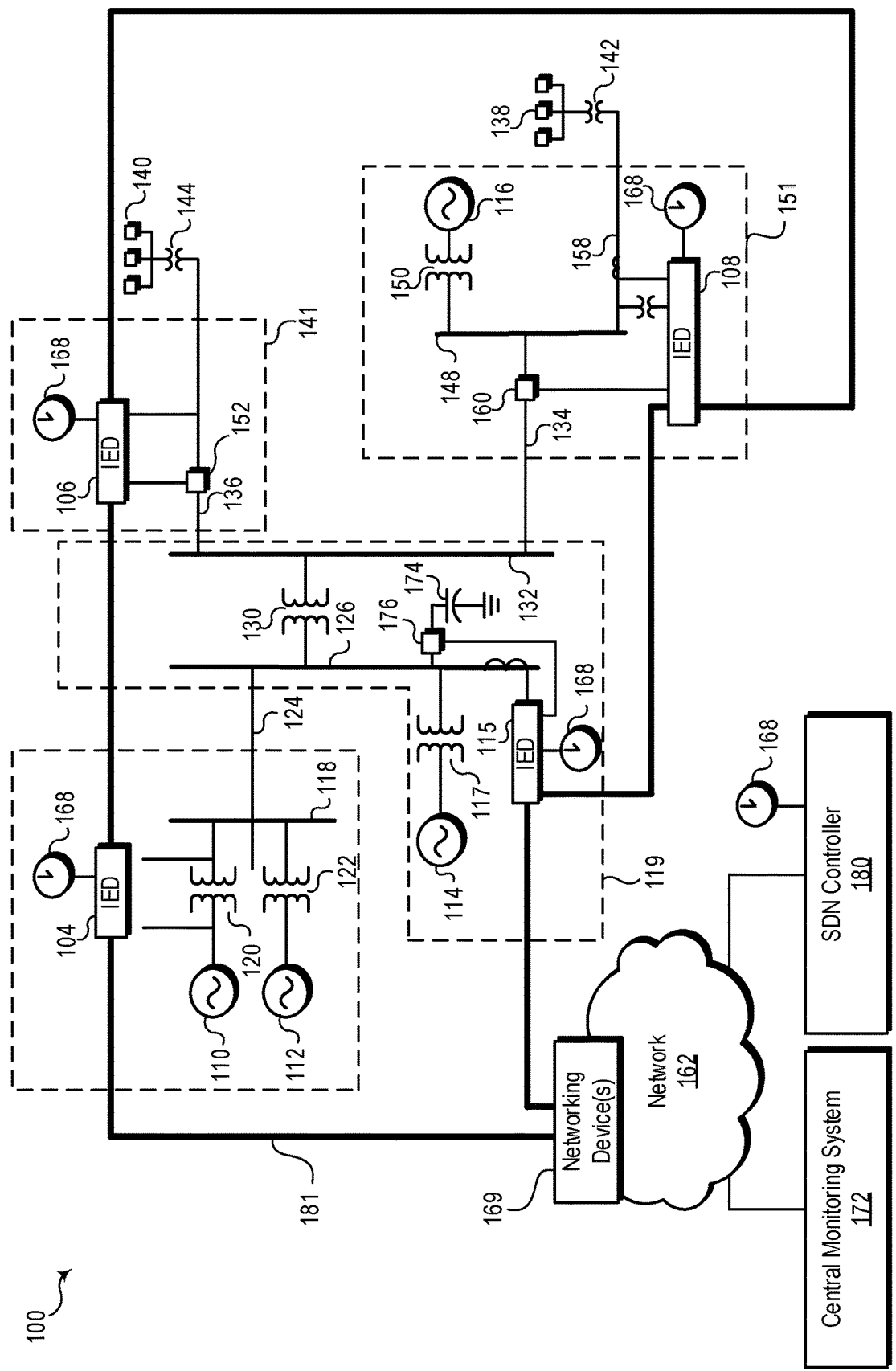
FIG. 1 illustrates an example of a simplified one-line diagram of an electric power transmission and distribution system in which various devices communicate via a ring network and/or are configured via a software-defined network (SDN) controller.

Electric power distribution and transmission systems include various control, monitoring, and/or protection devices. A wide variety of communication and networking technologies may enable control, protection, and/or monitoring functions within an electric power distribution or transmission system. Communication and networking devices may, among other things, facilitate an exchange of information, transmission of control instructions, and/or enable data acquisition.

Some electric power distribution and transmission systems may incorporate software-defined network (SDN) technologies to configure intelligent electronic devices (IEDs) and/or regulate communications on a network interconnecting data stores, control devices, monitoring devices, protective devices, human interfaces, and/or other electronic equipment.

In various embodiments, IEDs are connected to a communication network forming a ring. The resulting ring network includes IEDs and/or networking devices. Networking devices enable the IEDs in the ring network to communicate with systems not included in the ring network, such as SDN controllers, central monitoring systems, and/or devices on a wide area network.

In some embodiments, a network engineer or other information technology (IT) technician may use an SDN controller (e.g., a software application running on a general-purpose computer) to configure IEDs and/or networking devices. IEDs are configured to control various aspects of the electric power distribution and transmission system, communicate with one another, and/or communicate with systems not included in the ring network.

In various embodiments, IEDs are unaware of their location relative to other IEDs within a ring network. An IED communicates with another IED, a network device, and/or a system external to the ring network by transmitting a data packet that includes a recipient identifier (e.g., in a data packet header) to a neighboring IED or networking device. Each IED receiving the transmitted data packet forwards the data packet around the ring to a neighboring IED or networking device until the data packet is received by the intended IED or networking device.

In various embodiments, a network communication system may include a plurality of IEDs connected in a ring network (e.g., via an Ethernet communication network). A software-defined networking device may be connected in the ring network to manage communications within the ring network. The software-defined networking device may direct data packet to one or more of the IEDs in a first direction around the ring network.

The software-defined networking device may inspect a data packet intended for a first IED to determine if the data packet requests, or is otherwise expected to elicit, a responsive data packet from the first IED. The software-defined networking device may then monitor subsequently received data packets to identify a data packet originating from the first IED within an expected response time. If a data packet is received from the first IED, then the existing flow path may be confirmed as functional. If no data packet originating from the first IED is detected within the expected response time, the software-defined networking device may identify a failure in the flow path and/or modify the flow path to address the failure. Additional embodiments, specific examples, and some variations are described below in conjunction with the figures.

Unless context dictates otherwise, the phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as general-purpose computers, computer programming tools and techniques, digital storage media, virtual computers, virtual networking devices, and communications networks. A computer may include a processor, such as a microprocessor, microcontroller, logic circuitry, or the like. The processor may include a special purpose processing device, such as an ASIC, PAL, PLA, PLD, FPGA, or other customized or programmable device. The computer may also include a computer-readable storage device, such as non-volatile memory, static RAM, dynamic RAM, ROM, CD-ROM, disk, tape, magnetic, optical, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from any of a wide variety of companies, and may operate using a wide variety of known protocols over various types of physical network connections, such as twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism. Thus, it is appreciated that the systems and methods described herein are not limited to the specific network types described herein. Rather, any of a wide variety of network architectures may utilize the systems and methods described herein.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc. that perform one or more tasks or implement particular abstract data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates an embodiment of a simplified one-line diagram of an electric power transmission and distribution system 100 in which a plurality of communication devices and/or intelligent electronic devices (IEDs), such as IEDs 104, 106, 108, and 115, facilitate communication in a software-defined network (SDN) consistent with embodiments of the present disclosure. The electric power delivery system 100 may be configured to generate, transmit, and distribute electric energy to loads.

Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, 136 and 158), circuit breakers (e.g., breakers 152, 160, 176), busses (e.g., busses 118, 126, 132, and 148), loads (e.g., loads 138 and 140) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to the bus 126 through the step-up transformer 117. The bus 126 may be connected to the distribution bus 132 via the step-down transformer 130. Various distribution lines 136 and 134 may be connected to the distribution bus 132. The distribution line 136 may lead to the substation 141 and the line 136 may be monitored and/or controlled using an IED 106, which may selectively open and close the breaker 152. The load 140 may be fed from the distribution line 136. The step-down transformer 144 in communication with the distribution bus 132 via the distribution line 136 may be used to step down a voltage for consumption by the load 140.

The distribution line 134 may lead to a substation 151 and deliver electric power to the bus 148. The bus 148 may also receive electric power from the distributed generator 116 via a transformer 150. The distribution line 158 may deliver electric power from the bus 148 to the load 138 and may include another step-down transformer 142. The circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using IEDs, such as IEDs 104, 106, 108, and 115, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, and 115) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

According to various embodiments, IEDs may be in communication with other IEDs via the ring network 181. For example, IED 104 may communicate with IED 108 via the ring network 181 that passes through IED 106. In another example, IED 104 may communicate with IED 108 via the ring network 181 that passes through a networking device 169 and IED 115. In some embodiments, IEDs may communicate with devices and/or systems not included in the ring network 181. For example, an IED may communicate with an SDN controller 180, the central monitoring system 172, and/or other systems via the networking device 169.

A common time signal 168 may be distributed throughout system 100. Utilizing a common or universal time source may ensure that IEDs have a synchronized time signal that can be used to generate time-synchronized data, such as synchrophasors. In various embodiments, IEDs 104, 106, 108, and 115 may receive a common time signal 168. The common time signal 168 may be distributed in system 100 using a communications network 162 or using a common time source, such as a Global Navigation Satellite System (GNSS), or the like. The common time signal 168 may be distributed using, for example, PTP or NTP protocols.

According to various embodiments, the central monitoring system 172 may comprise one or more of a variety of types of systems. For example, central monitoring system 172 may include a supervisory control and data acquisition (SCADA) system and/or a wide area control and situational awareness (WACSA) system.

Devices included in the ring network 181 and devices and/or systems not included in the ring network 181 may communicate via the networking devices 169. One or more of the networking devices 169 may receive the common time signal 168. Examples of a networking device include, but are not limited to, multiplexers, routers, hubs, gateways, firewalls, and switches. In some embodiments, IEDs and networking devices may comprise physically distinct devices. In other embodiments, IEDs and networking devices may be composite devices or may be configured in a variety of ways to perform overlapping functions. IEDs and networking devices may comprise multi-function hardware (e.g., processors, computer-readable storage media, communications interfaces, etc.) that can be utilized to perform a variety of tasks that pertain to network communications and/or the operation of equipment within system 100.

The SDN controller 180 may be configured to interface with one or more of the networking devices 169 and/or IEDs 104, 106, 108, and 115. The SDN controller 180 may facilitate the creation of an SDN within the network 162 that facilitates communication between various devices, including IEDs 104, 106, 108, and 115 and central monitoring system 172. In various embodiments, the SDN controller 180 may be configured to interface with a control plane (not shown) in the network 162. An operator may use the SDN controller 180 to define (e.g., program) network operation profiles of one or more of the networking devices 169 connected to the network 162 and IEDs 104, 106, 108, and 115 in the ring network 181.

Figure 2:
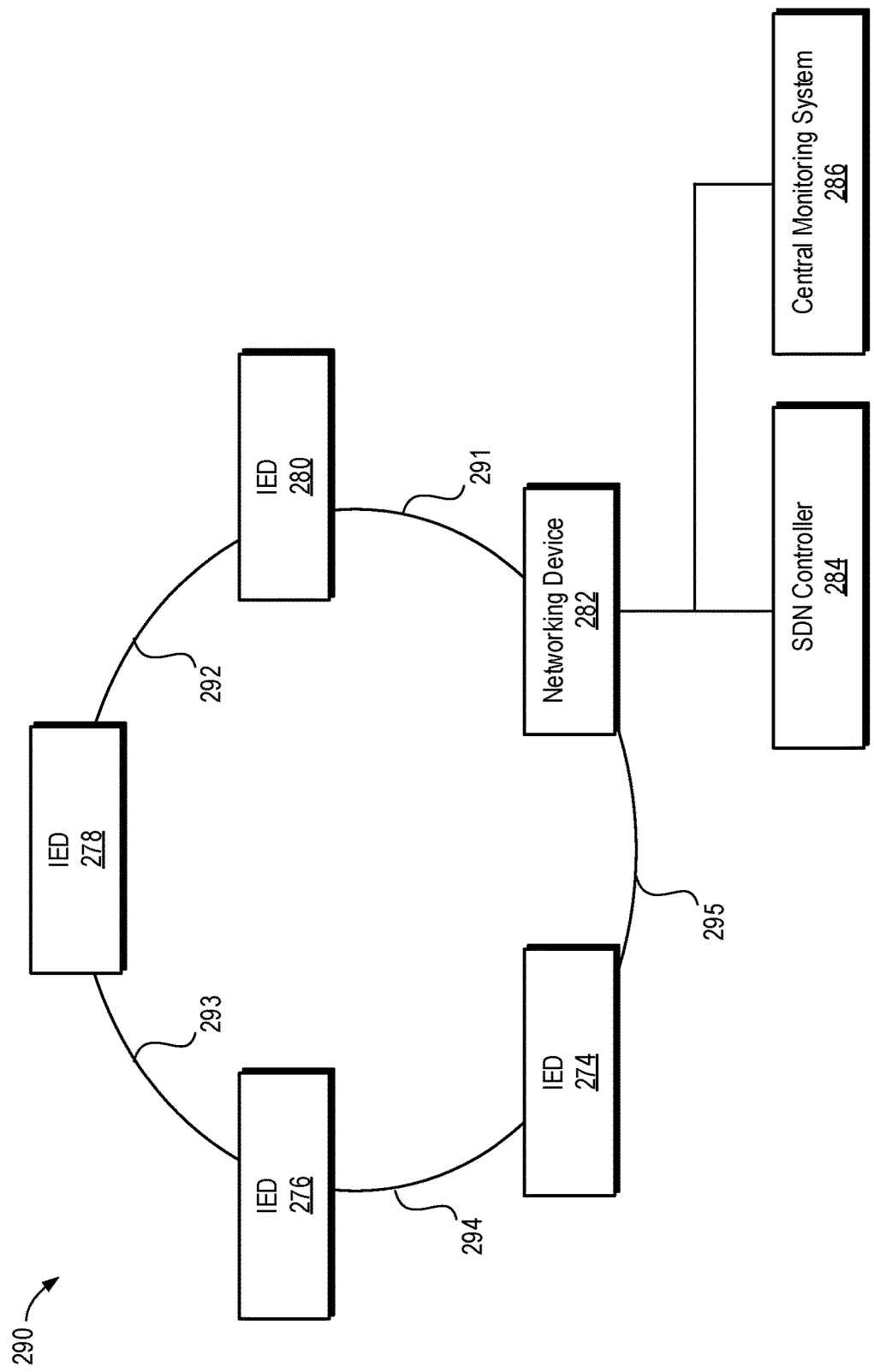
FIG. 2 illustrates an example block diagram of several intelligent electronic devices (IEDs) and a networking device connected to a ring network, as well as an SDN controller and a central monitoring system.

FIG. 2 illustrates an example block diagram of several IEDs 280, 278, 276, and 274 and a networking device 282 (e.g., a networking appliance) connected to a ring network 290, as well as an SDN controller 284 and a central monitoring system 286. The SDN controller 284 may configure the networking device 282 to operate within the ring network 290. The SDN controller 284 may, for example, configure the networking device 282 to initially determine a default or initial communication path for each IED in the ring network 290. For example, the networking device 282 may communicate with IED 280 via communication link 291 and IED 278 with communication link 292. IED 280 may facilitate communication with IED 278 by forwarding data packets intended for the IED 278 via communication link 292.

Similarly, the networking device 282 may be configured to communicate with IED 276 via communication link 295, IED 274, and communication link 294. The networking device 282 may communicate with IED 274 via communication link 295. Any number of IEDs may be configured as part of ring network 290 with any number of communication links therebetween to form the ring network 290. In the illustrated embodiment, the SDN controller 284 and the central monitoring system 286 are shown as separate systems. In other embodiments, the SDN controller 284 and central monitoring system 286 may be combined as part of a single device.

As illustrated, each IED may communicate with at least one other IED. For example, IED 278 may communicate with IED 280 or IED 276. Since the IED 280 is in the ring topology, the IED 280 may not have spanning tree or other networking capabilities. Instead, each IED acts as a receiving IED when it receives a data packet. If the data packet received by the receiving IED is intended for the receiving IED, a responsive data packet is returned in the opposite direction from which the data packet was received. In contrast, if the data packet received by the receiving IED is intended for a different device (e.g., another IED or the networking device 282), the receiving IED forwards the data packet along the ring network 290.

For example, if the IED 280 receives a data packet via communication link 291 that is not intended for the IED 280, the data packet is forwarded along communication link 292. However, if the IED 280 receives a data packet via communication link 291 that is intended for the IED 280, then a responsive data packet may be returned in the opposite direction via communication link 291.

The SDN controller 284 may program or otherwise configure the networking device 282 to quickly detect a failure within ring network 290. The ring network 290 may utilize standard IEEE communication protocols, such as Ethernet protocols, to allow for plug-and-play connections of IEDs and other devices. The IEEE protocols, such as Ethernet, may include integrated routines to detect unresponsive IEDs and/or communication link failures (e.g., timeout and/or dropout times). However, such routines may operate on the order of 2-10 seconds by simply assuming a connection problem exists due to a lack of any network traffic during a relatively long period of time.

The presently described systems and methods leverage SDN programming of the networking device 282 by an SDN controller 284 to detect flow path failure based on packet inspections and unreceived expected responses from an IED. The SDN-configured networking device 282 may detect flow path failure much faster than default IEEE protocols. For instance, the networking device 282 may detect a flow path failure in less than a millisecond (e.g., a few hundred microseconds or less).

For example, the networking device 282 may receive a data packet intended for the IED 278. The networking device 282 may inspect the data packet and determine that the data packet is expected to elicit a response from the intended IED 278. The networking device 282 may transmit the data packet to the IED 280 via communication link 291. The IED 280 may forward the data packet to the intended IED 278 via communication link 292. The networking device may be aware of how long it will take for the data packet to reach the IED 278 (e.g., based on prior interactions and/or network initialization). The networking device 282 may estimate an expected time for the IED 278 to respond to the data packet. The expected time may be, for example, based on the expected travel time of the data packet to the IED 278, the travel time of the responsive data packet from the IED 278, and an estimated delay for internal processing by the IED 278. The networking device 282 may identify a flow path failure based on not receiving the expected responsive data packet from the IED 278.

The networking device 282 may issue a notification or alarm based on the identified flow path failure. In other embodiments, the networking device 282 may additionally or alternatively retransmit the original data packet in the other direction around the ring network 290 to the IED 278. Specifically, the networking device 282 may transmit the original data packet to the IED 274 via the communication link 295. The IED 274 may forward the data packet to the IED 276 via the communication link 294. The IED 276 may then forward the data packet to the intended IED 278 via the communication link 293. The IED 278 may be unaware that the communication link 292 has failed but be preconfigured to communicate back in the opposite direction from which it received the data packet. Accordingly, the networking device 282 modifies the packet flow in response to an identified flow path failure (e.g., a link break). The networking device 282 leverages the ring network 290 to self-heal the network upon identification of the flow path failure.

Figure 3:
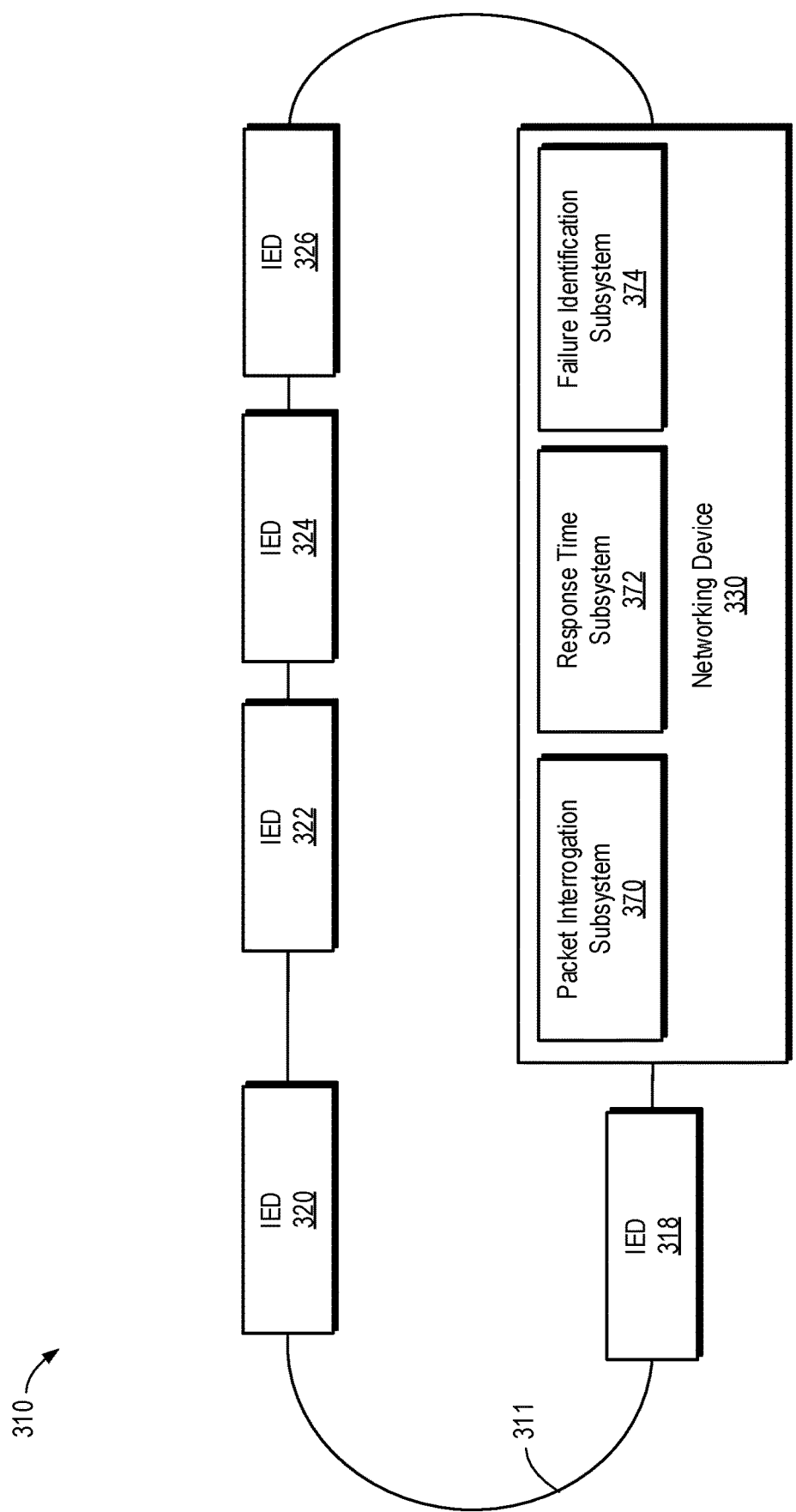
FIG. 3 illustrates an example block diagram of a ring network with a networking device to inspect packets transmitted within a ring network.

FIG. 3 illustrates an example block diagram of a networking device 330 configured to inspect data packets transmitted within ring network 310. The example block diagram includes five IEDs 318-236, but any number of IEDs and/or other network-enabled devices may be part of ring network 310. As described herein, the networking device 330 may include a packet interrogation subsystem 370 to inspect data packets within the ring network 310. Specifically, the packet interrogation subsystem 370 may inspect data packets intended for the IEDs 318-326. For example, the packet interrogation subsystem 370 may inspect a data packet intended for the IED 320. The packet interrogation subsystem 370 may determine that the data packet will, or is expected to, elicit a response from the intended IED 320. The networking device 330 may transmit the data packet clockwise around the ring network 310 to the intended IED 320.

A response time subsystem 372 may determine an expected response time associated with the inspected data packet. The expected response time may be based on the amount of time expected for the inspected data packet to arrive at the intended IED 320, processing time for the IED 320, and return time for a responsive data packet to arrive from the intended IED 320 back to the networking device 330. For example, the response time subsystem 372 may determine an expected response time to be less than 200 milliseconds (e.g., 50 milliseconds for round trip transmission and 150 milliseconds for processing by the intended IED 320).

A failure identification subsystem 374 may monitor subsequent data packets received by the networking device 330 within the expected response time to determine if any of them are from the intended IED 320. If the failure identification subsystem 374 detects a data packet originating from the intended IED 320, then the networking device 330 maintains the network packet flow of the ring network 310. The networking device 330 does not necessarily confirm that the data packet from the intended IED 320 is actually responsive to the original, inspected data packet. Rather, the mere detection of a data packet from the IED 320 is sufficient to confirm the functionality of the ring network 310.

The failure identification subsystem 374 identifies a flow path failure based on the failure to detect a data packet within the expected response time from the intended IED 320. The networking device 330 may estimate that a communication link 311 has failed and modify the network flow to direct future data packets intended for the IED 320 counterclockwise around the ring network 310. In some instances, the original, inspected data packet identified as requesting, or otherwise expected to elicit, a response is retransmitted counterclockwise around the ring network 310.

Figure 4:
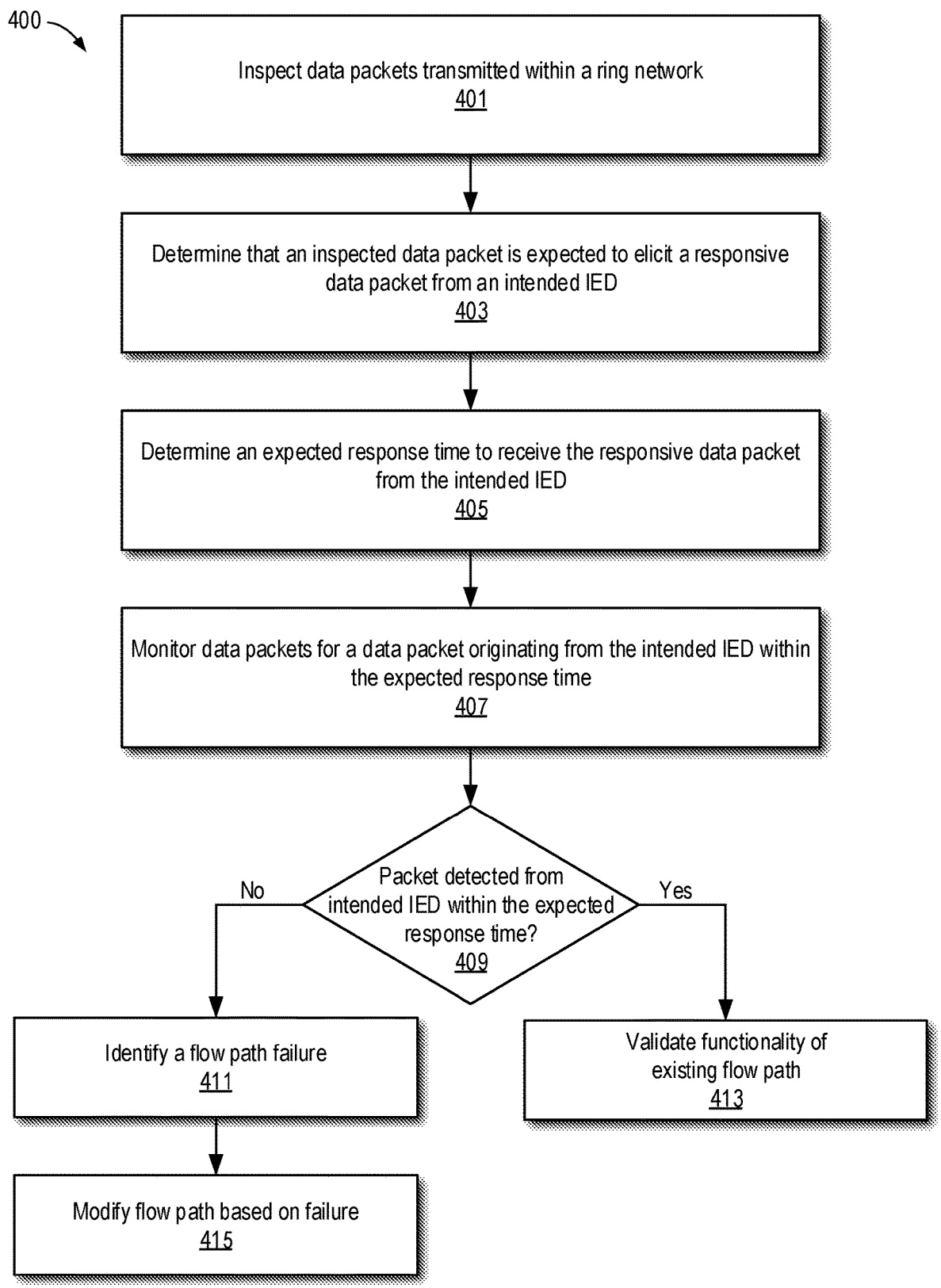
FIG. 4 illustrates a flow chart of an example method for detecting a flow path failure in a ring network.

FIG. 4 illustrates a flow chart 400 of an example method for modifying a flow path based on a flow path failure detected using packet inspection in a ring network. A networking device may inspect, at 401, data packets transmitted within a ring network. The networking device may determine, at 403, that an inspected data packet is expected to elicit a responsive data packet from an intended IED. The networking device may determine, at 405, an expected response time to receive a responsive data packet from the intended IED.

The networking device may then monitor, at 407, subsequent data packets transmitted within the ring network to identify a data packet originating from the intended IED. The networking device may identify, at 409, a data packet originating from the intended IED and validate, at 413, the functionality of the ring network. However, if the networking device fails to identify, at 409, a data packet originating from the intended IED within the expected response time, then the networking device may identify, at 411, a flow path failure.

In various embodiments, the networking device may provide an alert or other notification regarding the flow path failure. In some embodiments, the networking device may also modify, at 415, the flow path based on the failure. For example, the networking device may transmit data packets in the opposite direction on the ring network that are intended for the IED associated with the failure in the original transmission direction on the ring network.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer-executable code located within a memory device and/or transmitted as transitory or nontransitory electronic signals over a system bus or wired or wireless network. Many of the embodiments described herein are shown in block diagram form and/or using logic symbols. It is appreciated that various elements of each of the illustrated and described embodiments could be implemented using FPGAs, custom ASICs, and/or as hardware/software combinations.

In the description above, various features are sometimes grouped in a single embodiment, figure, or description thereof to streamline this disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A system, comprising:
   intelligent electronic devices (IEDs);
   a communication network to communicatively connect the IEDs in a ring network; and
   a software-defined networking device connected to the ring network to:
   direct a first data packet to a first of the IEDs in a first direction around the ring network;
   inspect the first data packet intended for the first IED;
   determine that the inspected first data packet includes a request for a responsive data packet from the first IED;
   determine an expected response time during which the software-defined networking device expects to receive the responsive data packet back from the first IED;
   monitor, during the expected response time, received data packets for the responsive data packet originating from the first IED;
   identify a flow path failure based on a failure to identify the responsive data packet originating from the first IED in response to the first data packet within the expected response time; and
   modify the flow path in response to the identified flow path failure so that data packets are transmitted to the first IED in a second direction around the ring network that is opposite the first direction.

2. The system of claim 1, wherein the expected response time is less than one millisecond.

3. The system of claim 1, wherein the expected response time corresponds to the sum of: two times the expected transmit time from the software-defined networking device and the first IED, and an expected processing time of the first IED to initiate the responsive data packet.

4. The system of claim 1, wherein the software-defined networking device is further configured to retransmit the inspected first data packet to the first IED in the second direction that is opposite the first direction.

5. The system of claim 1, wherein the modified flow path comprises transmitting subsequent data packets intended for the first IED and subsequent data packets intended for another of the IEDs in the second, opposite direction around the ring network.

6. The system of claim 1, further comprising a removable software-defined network (SDN) controller selectively connected to the software-defined networking device for configuration thereof.

7. The system of claim 1, wherein the communication network comprises an Ethernet communication network.

8. The system of claim 1, further comprising a central monitoring system to monitor network traffic in the ring network.

9. A method comprising:
   connecting intelligent electronic devices (IEDs) in a ring network;
   connecting a software-defined networking device to the ring network;
   directing, via the software-defined networking device, a first data packet to a first of the IEDs in a first direction around the ring network;
   inspecting the first data packet intended for the first IED;
   determining that the inspected first data packet is intended to elicit a response from the first IED in the form of a responsive data packet generated by the first IED within an expected response time;
   monitoring, during the expected response time, subsequently received data packets to identify the responsive data packet generated by the first IED;
   identifying a flow path failure based on a failure to identify the responsive data packet generated by the first IED within the expected response time; and
   modifying the flow path in response to the identified flow path failure such that data packets are transmitted to the first IED in a second direction around the ring network that is opposite the first direction.

10. The method of claim 9, wherein the expected response time is less than one millisecond.

11. The method of claim 9, further comprising transmitting the inspected data packet to the first IED around the ring network in a second direction opposite the first direction.

12. The method of claim 9, further comprising:
    connecting a software-defined network (SDN) controller to the software-defined networking device; and
    programming the software-defined networking device via the SDN controller.

13. The method of claim 12, further comprising disconnecting the SDN controller from the software-defined networking device after programming.

14. The method of claim 9, wherein the ring network comprises a wired, Ethernet communication network.

15. A network communication system, comprising:
    intelligent electronic devices (IEDs) connected in an Ethernet ring network;
    a software-defined networking device connected to the Ethernet ring network; and
    a removable software-defined network (SDN) controller to program the software-defined networking device to:
    direct a first data packet to a first of the IEDs in a first direction around the Ethernet ring network;
    inspect the first data packet intended for the first IED;
    determine, based on information in the inspected first data packet, that a responsive data packet is expected to be generated by the first IED in response to the first data packet within an expected response time;
    monitor, during the expected response time subsequently received data packets to identify the responsive data packet generated by the first IED within the expected response time;
    identify a flow path failure in response to a failure to identify the responsive data packet generated by the first IED within the expected response time; and
    modify the flow path based on the identified flow path failure such that data packets are transmitted to the first IED in a second direction around the ring network that is opposite the first direction.

16. The system of claim 15, wherein the SDN controller is further configured to program the software-defined networking device to determine the expected response time within which the first IED is expected to provide the responsive data packet, and wherein the determined expected response time is less than a standardized timeout or dropout time specified within the Ethernet protocol.

* * * * *